(12) United States Patent
Liu et al.

(10) Patent No.: US 10,227,666 B2
(45) Date of Patent: Mar. 12, 2019

(54) SOLID CATALYSTS AND METHOD FOR PREPARING SUGARS USING THE SAME

(71) Applicant: Industrial Technology Research Institute, Hsinchu (TW)

(72) Inventors: Chiung-Fang Liu, Taipei (TW); Wei-Chun Hung, New Taipei (TW); Hou-Peng Wan, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/372,544

(22) Filed: Dec. 8, 2016

(65) Prior Publication Data

US 2017/0166985 A1 Jun. 15, 2017

(30) Foreign Application Priority Data

Dec. 10, 2015 (TW) .............................. 104141463 A
Sep. 8, 2016 (TW) .............................. 105129064 A

(51) Int. Cl.
*C13K 1/02* (2006.01)
*B01J 27/053* (2006.01)
(Continued)

(52) U.S. Cl.
CPC ................ *C13K 1/02* (2013.01); *B01J 21/18* (2013.01); *B01J 23/745* (2013.01); *B01J 27/053* (2013.01);
(Continued)

(58) Field of Classification Search
None
See application file for complete search history.

(56) References Cited

U.S. PATENT DOCUMENTS 257,607 A    5/1882  Parkes
607,091 A    7/1898  Simonsen
(Continued)

FOREIGN PATENT DOCUMENTS

CN    1174030 C   * 11/2004
CN    1915507 A     2/2007
(Continued)

OTHER PUBLICATIONS

Dussan et al, dilute acid hydrolysis of cellulose to glucose from sugarcane bagasse, chemical engineering transactions. Jan. 2014 ( Year: 2014).*
(Continued)

*Primary Examiner* — Melvin C. Mayes
*Assistant Examiner* — Stefanie J Cohen
(74) *Attorney, Agent, or Firm* — Birch, Stewart, Kolasch & Birch, LLP

(57) ABSTRACT

A solid catalyst is provided. The solid catalyst includes a core particle composed of activated carbon, lignin or iron oxide, and a plurality of hydroxyl groups and sulfonic acid groups formed on the surface of the core particle. A method for preparing a sugar is also provided. The method includes mixing organic acid and the disclosed solid catalyst to form a mixing solution, adding a cellulosic biomass to the mixing solution to proceed to a dissolution reaction, and adding water to the mixing solution to proceed to a hydrolysis reaction to obtain a hydrolysis product.

22 Claims, 4 Drawing Sheets

(51) Int. Cl.
  *B01J 31/00* (2006.01)
  *B01J 31/06* (2006.01)
  *B01J 21/18* (2006.01)
  *B01J 23/745* (2006.01)
  *B01J 35/02* (2006.01)
  *B01J 35/00* (2006.01)

(52) U.S. Cl.
  CPC ............... *B01J 31/00* (2013.01); *B01J 31/06* (2013.01); *B01J 35/002* (2013.01); *B01J 35/023* (2013.01); *B01J 2231/40* (2013.01)

(56) References Cited

U.S. PATENT DOCUMENTS

| | | | |
|---|---|---|---|
| 647,805 | A | 4/1900 | Classen |
| 4,018,620 | A | 4/1977 | Penque |
| 4,452,640 | A | 6/1984 | Chen et al. |
| 8,945,309 | B2 | 2/2015 | Fukuoka et al. |
| 9,150,937 | B2 * | 10/2015 | Hung ................ C13K 1/04 |
| 2009/0217922 | A1 | 9/2009 | Fukuoka et al. |
| 2013/0281733 | A1 | 10/2013 | Han et al. |
| 2014/0216442 | A1 * | 8/2014 | Hung ................ C13K 1/02 127/37 |

FOREIGN PATENT DOCUMENTS

| | | |
|---|---|---|
| CN | 101314138 A | 12/2008 |
| CN | 101394928 A | 3/2009 |
| CN | 101638442 A | 2/2010 |
| CN | 101733088 A | 6/2010 |
| CN | 101920205 A | 12/2010 |
| CN | 102489316 A | 6/2012 |
| CN | 102513111 A | 6/2012 |
| CN | 102513159 A | 6/2012 |
| CN | 102965203 A | 3/2013 |
| CN | 103084187 A | 5/2013 |
| CN | 103130638 A | 6/2013 |
| CN | 103212440 A | 7/2013 |
| CN | 103442816 A | 12/2013 |
| CN | 103966367 A | 8/2014 |
| CN | 104028307 A | 9/2014 |
| EP | 2 011 569 A1 | 1/2009 |
| EP | 2 100 972 A1 | 9/2009 |
| JP | 2015017018 A * | 1/2015 |
| TW | I467022 B | 1/2015 |
| TW | I467023 B | 1/2015 |
| TW | I484039 B | 5/2015 |

OTHER PUBLICATIONS

JP2015017018—English translation, Jan. 2015 (Year: 2015).*
CN-1174030-C—english translation (Year: 2004).*
Mahmoudi et al, facial preparation of sulfonic acid functionalized magnetite-coated maghemite as a magnetically seperable catalyst for pyrrole synthesis, chemcatchem, 5, pp. 3743-3749 (Year: 2013).*
Taiwanese Office Action and Search Report for Taiwanese Application No. 105129064, dated Jun. 8, 2017.
Atsushi Takagaki et al., "Hydrolysis of Sugars Using Magnetic Silica Nanoparticles with Sulfonic Acid Groups", Chem. Lett., vol. 40, 2011, pp. 1195-1197.
Ayumu Onda et al., "Selective hydrolysis of cellulose into glucose over solid acid catalysts", Green Chemistry, vol. 10, 2008, pp. 1033-1037.
Fan Zhang et al., "Hydrolysis of cellulose to glucose at the low temperature of 423 K with CaFe2O4-based solid catalyst", Bioresource Technology, vol. 124, 2012, pp. 440-445, (21 total pages).
Li Shuai et al., "Hydrolysis of cellulose by cellulase-mimetic solid catalyst", Energy & Environmental Science, vol. 5, 2012, pp. 6889-6894.
Roberto Rinaldi et al., "Depolymerization of Cellulose Using Solid Catalysts in Ionic Liquids", Angewandte Chemie International Edition, 2008, vol. 47, pp. 8047-8050.
Roberto Rinaldi et al., "Which Controls the Depolymerization of Cellulose in Ionic Liquids: The Solid Acid Catalyst or Cellulose?", ChemSusChem, vol. 3, 2010, pp. 266-276.
Taiwanese Office Action for Appl. No. 106134027 dated Jul. 23, 2018.

* cited by examiner

SOLID CATALYSTS AND METHOD FOR PREPARING SUGARS USING THE SAME

CROSS REFERENCE TO RELATED APPLICATIONS

This application claims priority of Taiwan Patent Application No. 104141463, filed on Dec. 10, 2015, and priority of Taiwan Patent Application No. 105129064, filed on Sep. 8, 2016, the entirety of which is incorporated by reference herein.

TECHNICAL FIELD

The technical field relates to a solid catalyst and a method for preparing a sugar utilizing the solid catalyst.

BACKGROUND

Generally, biomass exists in the form of organics, for instance, grass, wood, crops and residues and wastes thereof. First-generation biofuels were mainly bioalcohol and biodiesel generated from sugar, starch, and vegetable oil. However, the first-generation biofuel faces the problem of competition between raw materials and food. Moreover, the applications of first-generation biofuel are restricted due to a lack of fertile soil capable of supporting the growth of these biomasses.

In order to overcome the first-generation biofuel's shortcomings in terms of raw-material shortage, the second-generation biofuel used lignocelluloses as raw materials. Lignocellulose is capable of growing in a barren land. There is around 22 billion tons of biomass (the energy content thereof is around 45EJ) per year in the world, wherein the lignocellulose accounts for around about 70-95%. Lignocellulose mainly comprises three kinds of ingredients, which are cellulose (40-50%), hemicellulose (25-35%) and lignin (15-20%). Cellulose is the most useful among them when being converted into glucose, and forming bioalcohol through fermentation or bio-platform molecules through dehydration is considered to be the most promising option as a substitute for petroleum-based fuels.

Cellulose is the main ingredient of lignocellulose, which is a polymer generated from combination of glucose monomers through $\beta$-1,4 glycosidic bonds. $\beta$-1,4 glycosidic bond can be destroyed by acid, causing cellulose hydrolysis and generating compounds such as glucose or oligosaccharides, etc. The first acid used in cellulose hydrolysis to produce sugar was an inorganic acid. However, the existence of these inorganic acids causes problems, including difficulty separating products, reactor corrosion, difficulty reusing the catalyst, and wastewater treatment. These problems urgently need to be overcome. Although a recently developed solid catalyst technology is capable of solving the above-mentioned problems, other problems remain, including a small contact area with reactants, low acidity, and weak mechanical strength. These can result in inefficient cellulose hydrolysis of the solid catalyst, and long-term use may causes a decrease in mechanical strength and lead to collapse.

SUMMARY

One embodiment of the disclosure provides a solid catalyst, including: a core particle having a surface composed of activated carbon, lignin or iron oxide; and a plurality of hydroxyl groups and sulfonic acid groups formed on the surface of the core particle.

One embodiment of the disclosure provides a method for preparing a sugar, including: mixing an organic acid and the disclosed solid catalyst to form a mixing solution; adding a cellulosic biomass to the mixing solution to proceed to a dissolution reaction; and adding water to the mixing solution to proceed to a hydrolysis reaction to obtain a hydrolysis product.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
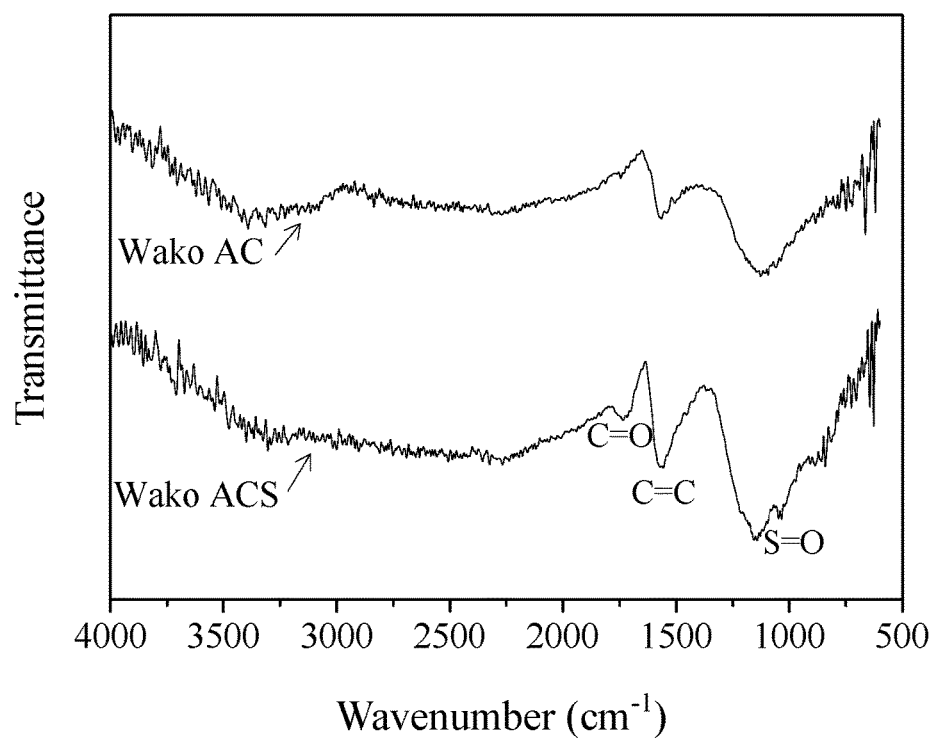
FIG. 1 shows a FTIR spectrum of a sulfonated activated carbon solid catalyst in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a solid catalyst, including: a core particle having a surface composed of activated carbon, lignin or iron oxide; and a plurality of hydroxyl groups and sulfonic acid groups formed on the surface of the core particle.

In some embodiments, the core particle is composed of activated carbon and has a particle size of about 10-60 μm.

In some embodiments, the core particle is composed of lignin and has a particle size of about 100-300 μm.

In some embodiments, the core particle is composed of iron oxide and has a particle size of about 0.5-20 μm.

In some embodiments, the solid catalyst has an acidity of about 0.6-5.8 mmol [$H^+$]/g catalyst.

In the disclosure, the functional groups such as hydroxyl groups and sulfonic acid groups formed on the surface of the particle of the solid catalyst effectively increase affinity with cellulosic biomass.

One embodiment of the disclosure provides a method for preparing a sugar, including: mixing an organic acid and a solid catalyst to form a mixing solution; adding a cellulosic biomass to the mixing solution to proceed to a dissolution reaction; and adding water to the mixing solution to proceed to a hydrolysis reaction to obtain a hydrolysis product.

In some embodiments, the organic acid may comprise formic acid, acetic acid or a mixture thereof.

In some embodiments, the organic acid has a weight ratio of about 75-95 wt % in the mixing solution.

In some embodiments, the solid catalyst may comprise: a core particle having a surface composed of activated carbon, lignin or iron oxide; and a plurality of hydroxyl groups and sulfonic acid groups formed on the surface of the core particle.

In some embodiments, the core particle is composed of activated carbon and has a particle size of about 10-60 μm.

In some embodiments, the core particle is composed of lignin and has a particle size of about 100-300 μm.

In some embodiments, the core particle is composed of iron oxide and has a particle size of about 0.5-20 μm.

In some embodiments, the solid catalyst has an acidity of about 0.6-5.8 mmol [H$^+$]/g catalyst.

In some embodiments, the solid catalyst has a weight ratio of about 0.5-21 wt % in the mixing solution.

In some embodiments, the cellulosic biomass may comprise whole cellulose, hemicellulose or lignin.

In some embodiments, the cellulosic biomass has a weight ratio of about 5-25 wt % in the mixing solution.

In some embodiments, the cellulosic biomass may be derived from wood, grass, leaves, algae, waste paper, corn stalk, corn cobs, rice straw, rice husk, wheat straw, bagasse, bamboo or crop stems.

In some embodiments, the disclosed method for preparing a sugar further comprises adding an azeotropic agent to the mixing solution to proceed to the dissolution reaction.

In some embodiments, the azeotropic agent may comprise esters, ketones or alkanes, for example, n-hexane.

In some embodiments, the azeotropic agent has a weight ratio of about 15-45 wt % in the mixing solution.

In some embodiments, the disclosed method for preparing a sugar further comprises adding an inorganic acid to the mixing solution to proceed to the dissolution reaction.

In some embodiments, the inorganic acid may comprise hydrochloric acid, sulfuric acid, phosphoric acid, nitric acid or a combination thereof.

In some embodiments, the inorganic acid has a weight ratio of about 0.5-3 wt % in the mixing solution.

In some embodiments, the dissolution reaction has a reaction temperature of about 60-101° C.

In some embodiments, the dissolution reaction has a reaction time of about 60-240 minutes.

In some embodiments, the dissolution reaction has a reaction pressure of about 0.9-1.1 atm.

In some embodiments, water has a weight ratio of about 25-100 wt % in the mixing solution.

In some embodiments, the hydrolysis reaction has a reaction temperature of about 100-110° C.

In some embodiments, the hydrolysis reaction has a reaction time of about 30-180 minutes.

In some embodiments, the hydrolysis reaction has a reaction pressure of about 0.9-1.1 atm.

In some embodiments, the disclosed method for preparing a sugar further comprises adding an inorganic acid to the hydrolysis product to proceed to a secondary hydrolysis reaction.

In some embodiments, the inorganic acid may comprise hydrochloric acid, sulfuric acid, phosphoric acid, nitric acid or a combination thereof.

In some embodiments, the inorganic acid has a weight ratio of about 0.5-3 wt % in the hydrolysis product.

In the disclosure, under a catalytic environment of a specific solid catalyst, biomass or cellulose is subjected to an esterification reaction with an organic acid to form soluble organic acid cellulose ester with low crystallinity and high solubility which is favorable for the subsequent hydrolysis to produce sugar. Moreover, during the above-mentioned esterification reaction, an azeotropic agent, for instance, ketones, ethers, alkanes, or n-hexane is adopted in the disclosure such that moisture generated from the esterification reaction and the azeotropic agent are formed into an azeotrope removing out from the esterification system which effectively improves esterification efficiency and increases the sugar yield of the subsequent hydrolysis. Moreover, the azeotropic agent is conducive to extracting the organic acid after the esterification reaction and improving the purity of the organic acid so that the organic acid can be reused during the manufacturing processes of sugar preparation. The azeotropic agent is capable of lowering the temperature of the esterification reaction and avoiding degradation and coking of saccharides. In addition, a small amount of inorganic acid is added to the product of the primary hydrolysis to carry out the secondary hydrolysis, improving the sugar yield. All the reaction processes are carried out at a temperature less than or equal to 101° C. and a pressure less than or equal to 1 atm. Furthermore, in order to easily separate out the solid catalyst after the reaction, the disclosure uses, for instance, a magnetic iron oxide substance ($Fe_3O_4$) with Lewis acid characteristics as a particle core, and after performing the surface sol-gelatinizing hydrophobic treatment by TEOS, a sulfonation reaction is performed on the surface of the particle to prepare a magnetic solid catalyst with dual functional groups of hydroxyl groups and sulfonic acid groups which has high reactivity and product selectivity in the cellulose-formic acid esterification system. The surface of the iron oxide substance is protected by the sol-gelatinizing substance. Therefore, the iron oxide substance will not be dissolved out by acid. After the surface sol-gelatinizing, the iron oxide substance is further immersed in dilute sulfuric acid. After drying, it becomes a magnetic solid catalyst with Bronsted acid characteristics, and its acidity is, for example, 0.76 mmol [H+]/g. It can be applied to the field of cellulose hydrolysis to produce sugar.

The main effects of the disclosure include: (I) A surface sol-gelatinizing hydrophobic treatment is performed on, for example, iron oxide powders through a sol-gel method, and the powder is further immersed in dilute sulfuric acid to prepare a magnetic solid catalyst with a saturated magnetic strength of greater than or equal to 60 emu/g, a particle size of less than or equal to 10 μm, a specific surface area of greater than or equal to 40 m$^2$/g and an acidity of greater than or equal to 0.7 mmol[H$^+$]/g; (II) After the reaction is completed, the above-mentioned iron oxide substance is not dissolved out because the magnetic catalyst is protected by the surface sol-gelatinizing substance, and products and the catalyst are separated through a magnetic separation method, attaining a recovery rate of greater than or equal to 98 wt % of the catalyst and a sugar yield of greater than or equal to 50 wt % of cellulose hydrolysis; (III) An azeotropic process is adopted to decrease generation of moisture during the processes of cellulose esterification dissolution, to increase a dissolution rate of cellulose and to improve the sugar yield of the cellulose hydrolysis; (IV) If a conventional Amberlyst 15 is used as a catalyst combined with the above-mentioned azeotropic process and the product of the primary hydrolysis is further subjected to the secondary hydrolysis with dilute acid, the sugar yield of cellulose hydrolyzate is substantially improved; and (V) if the magnetic catalyst is combined with the azeotropic process and dilute acid is added to implement the experiment of esterification hydrolysis of biomass to produce sugar, attaining a sugar yield of greater than or equal to 80 wt % of the biomass hydrolysis, after use, the saturated magnetic strength of the catalyst is more than 60 emu/g, the products and the catalyst are separated through the magnetic separation method, after the magnetic separation and catalyst regeneration, the catalyst is repeatedly used three times, the sugar yield still maintains at about 80 wt %.

EXAMPLES/COMPARATIVE EXAMPLES

Example 1

Preparation of the Solid Catalyst (1)(Sulfonated Activated Carbon)

A mixture of activated carbon and fuming sulfuric acid with a weight ratio of 1:10 was stirred for 8-16 hours and heated to 80-120° C. to proceed to a sulfonation reaction of the activated carbon. After the reaction was completed, the mixture was washed until the concentration of [$H^+$] of the washing solution was 1.5N to 3.0N. After filtration, the filter cake was dried (105° C.) and ground, and then sulfonated activated carbon was obtained.

The sulfonated activated carbon solid catalyst (code name: Wako ACS) prepared in this example and an unsulfonated activated carbon raw material (code name: Wako AC) were subjected to FTIR structure identification. The results were shown in FIG. 1. For the sulfonated activated carbon solid catalyst prepared in this example, a —OH functional group appeared at 2,500 $cm^{-1}$ to 3,500 $cm^{-1}$ and an S═O functional group appeared at 1,035 $cm^{-1}$ to 1,180 $cm^{-1}$ in the FTIR spectrum. It was concluded that the sulfonated activated carbon solid catalyst prepared in this example have dual functional groups of hydroxyl group (—OH) and sulfonic acid group (—$SO_3H$) indeed.

Example 2

Preparation of the Solid Catalyst (2)(Sulfonated Lignin)

A mixture of lignin and fuming sulfuric acid with a weight ratio of 1:10 was stirred for 8-16 hours and heated to 80-120° C. to proceed to a sulfonation reaction of the lignin. After the reaction was completed, the mixture was washed until the concentration of [$H^+$] of the washing solution was 1.5N to 3.0N. After filtration, the filter cake was dried (105° C.) and ground, and then sulfonated lignin was obtained.

Figure 2:
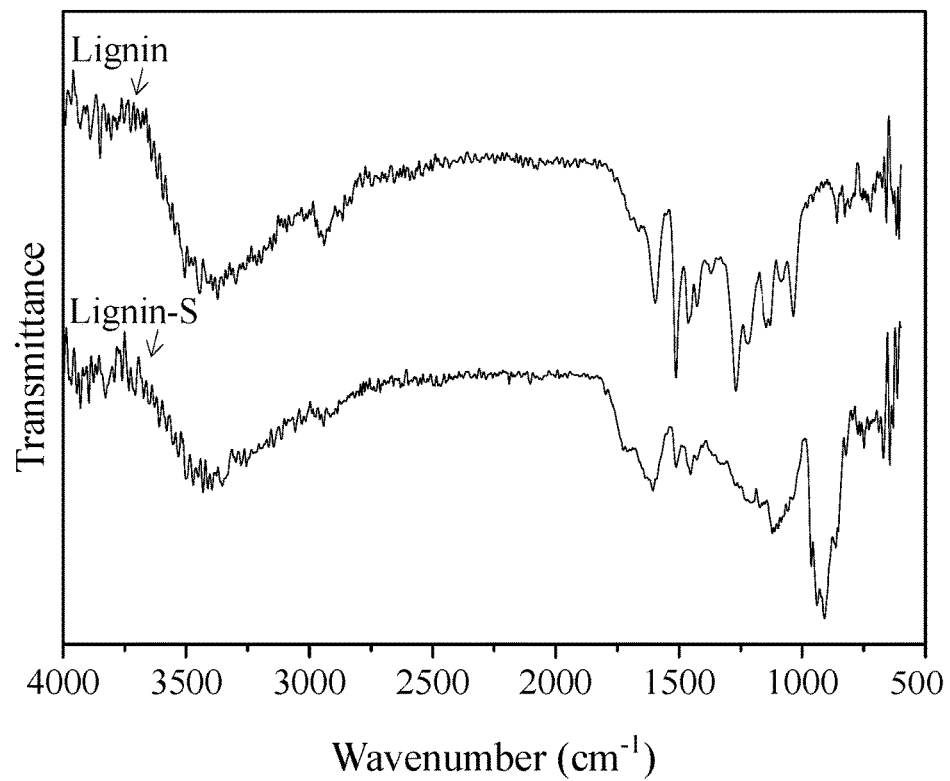
FIG. 2 shows a FTIR spectrum of a sulfonated lignin solid catalyst in accordance with one embodiment of the disclosure.

The sulfonated lignin solid catalyst (code name: Lignin-S) prepared in this example and an unsulfonated lignin (code name: Lignin) were subjected to FTIR structure identification. The results were shown in FIG. 2. For the sulfonated lignin solid catalyst prepared in this example, a —OH functional group appeared at 2,500 $cm^{-1}$ to 3,500 $cm^{-1}$ and an S═O functional group appeared at 1,035 $cm^{-1}$ to 1,180 $cm^{-1}$ in the FTIR spectrum. It was concluded that the sulfonated lignin solid catalyst prepared in this example have dual functional groups of hydroxyl group (—OH) and sulfonic acid group (—$SO_3H$) indeed.

Example 3

Preparation of the Solid Catalyst (3)(Bagasse Obtained after Sugar Production Subjected to Direct Sulfonation)

A mixture of bagasse obtained after sugar production and fuming sulfuric acid with a weight ratio of 1:10 was stirred for 8-16 hours and heated to 80-120° C. to proceed to a sulfonation reaction of the bagasse obtained after sugar production. After the reaction was completed, the mixture was washed until the concentration of [$H^+$] of the washing solution was 1.5N to 3.0N. After filtration, the filter cake was dried (105° C.) and ground, and then a product of bagasse obtained after sugar production subjected to direct sulfonation was obtained.

Figure 3:
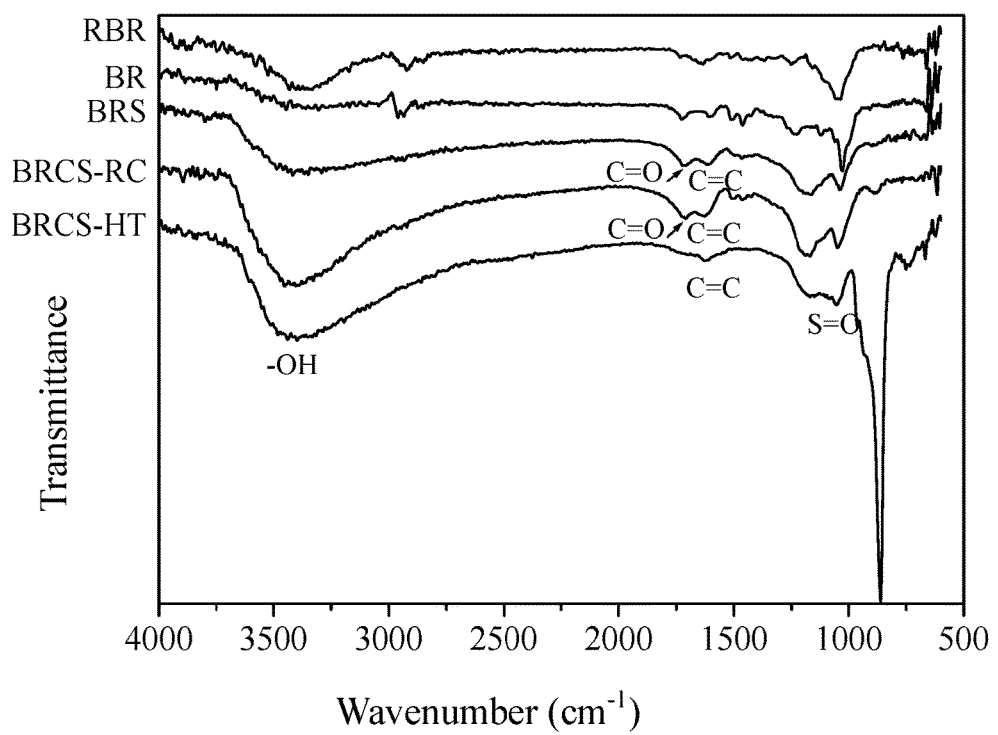
FIG. 3 shows a FTIR spectrum of solid catalysts of bagasse obtained after sugar production subjected to direct sulfonation, bagasse obtained after sugar production subjected to refluxing carbonization and sulfonation, and bagasse obtained after sugar production subjected to high-temperature carbonization and sulfonation in accordance with one embodiment of the disclosure.

The solid catalyst of bagasse obtained after sugar production subjected to direct sulfonation (code name: BRS) prepared in this example, an unsulfonated raw bagasse (code name: RBR) and an unsulfonated bagasse obtained after sugar production (code name: BR) were subjected to FTIR structure identification. The results were shown in FIG. 3. For the solid catalyst of bagasse obtained after sugar production subjected to direct sulfonation prepared in this example, a —OH functional group appeared at 2,500 $cm^{-1}$ to 3,500 $cm^{-1}$ and an S═O functional group appeared at 1,035 $cm^{-1}$ to 1,180 $cm^{-1}$ in the FTIR spectrum. It was concluded that the solid catalyst of bagasse obtained after sugar production subjected to direct sulfonation prepared in this example have dual functional groups of hydroxyl group (—OH) and sulfonic acid group (—$SO_3H$) indeed.

Example 4

Preparation of the Solid Catalyst (4)(Bagasse Obtained after Sugar Production Subjected to Refluxing Carbonization and Sulfonation)

A mixture of bagasse obtained after sugar production, 10% sulfuric acid and toluene with a weight ratio of 40:100:62.5 were subjected to refluxing carbonization under 85° C. for 24 hours. The reactant was washed until the pH value of the washing solution was 6-7. After filtration, the filter cake was dried (105° C.) and ground, and then a sample of bagasse obtained after sugar production subjected to refluxing carbonization was obtained. A mixture of the sample of bagasse obtained after sugar production subjected to refluxing carbonization and fuming sulfuric acid with a weight ratio of 1:10 was stirred for 8-16 hours and heated to 80-120° C. to proceed to a sulfonation reaction of the sample of bagasse obtained after sugar production subjected to refluxing carbonization. After the reaction was completed, the mixture was washed until the concentration of [$H^+$] of the washing solution was 1.5N to 3.0N. After filtration, the filter cake was dried (105° C.) and ground, and then a product of bagasse obtained after sugar production subjected to refluxing carbonization and sulfonation was obtained.

The solid catalyst of bagasse obtained after sugar production subjected to refluxing carbonization and sulfonation (code name: BRCS-RC) prepared in this example was subjected to FTIR structure identification. The result was shown in FIG. 3. For the solid catalyst of bagasse obtained after sugar production subjected to refluxing carbonization and sulfonation prepared in this example, a —OH functional group appeared at 2,500 $cm^{-1}$ to 3,500 $cm^{-1}$ and an S═O functional group appeared at 1,035 $cm^{-1}$ to 1,180 $cm^{-1}$ in the FTIR spectrum. It was concluded that the solid catalyst of bagasse obtained after sugar production subjected to refluxing carbonization and sulfonation prepared in this example have dual functional groups of hydroxyl group (—OH) and sulfonic acid group (—$SO_3H$) indeed.

Example 5

Preparation of the Solid Catalyst (5)(Bagasse Obtained after Sugar Production Subjected to High-Temperature Carbonization and Sulfonation)

A bagasse obtained after sugar production was carbonized under 600° C. for 24 hours and ground, and then a sample of bagasse obtained after sugar production subjected to high-temperature carbonization was obtained. A mixture of the sample of bagasse obtained after sugar production subjected to high-temperature carbonization and fuming sulfuric acid with a weight ratio of 1:10 was stirred for 8-16 hours and heated to 80-120° C. to proceed to a sulfonation reaction of the sample of bagasse obtained after sugar production subjected to high-temperature carbonization. After the reaction was completed, the mixture was washed until the concentration of [$H^+$] of the washing solution was 1.5N to 3.0N. After filtration, the filter cake was dried (105° C.) and ground, and then a product of bagasse obtained after sugar production subjected to high-temperature carbonization and sulfonation was obtained.

The solid catalyst of bagasse obtained after sugar production subjected to high-temperature carbonization and sulfonation (code name: BRCS-HT) prepared in this example was subjected to FTIR structure identification. The result was shown in FIG. 3. For the solid catalyst of bagasse obtained after sugar production subjected to high-temperature carbonization and sulfonation prepared in this example, a —OH functional group appeared at 2,500 $cm^{-1}$ to 3,500 $cm^{-1}$ and an S=O functional group appeared at 1,035 $cm^{-1}$ to 1,180 $cm^{-1}$ in the FTIR spectrum. It was concluded that the solid catalyst of bagasse obtained after sugar production subjected to high-temperature carbonization and sulfonation prepared in this example have dual functional groups of hydroxyl group (—OH) and sulfonic acid group (—$SO_3H$) indeed.

Example 6

Preparation of the Solid Catalyst (6)(Sulfonated Iron Oxide)

1 g $Fe_3O_4$ powder was added to a mixture of water, ethanol and ammonia with a weight ratio of 20:60:1.5, and $Fe_3O_4$ particles were dispersed by ultrasonic vibration at a system temperature of 50° C. A mixture of TEOS and water with a weight ratio of 0.45:10 was slowly added and stirred for 12 hours. Particles having a $Fe_3O_4$ core coated with $SiO_2$ and having —OH groups were obtained by magnetic separation. The sample was washed with methanol until the pH value of the washing solution was 7-8. The sample was dried and then 1 g was taken. The sample was immersed in a 3 wt % sulfuric acid solution, and the surface of the catalyst was partially sulfonated at 80° C. After the sample was washed, dried and ground, sulfonated iron oxide was obtained.

Figure 4:
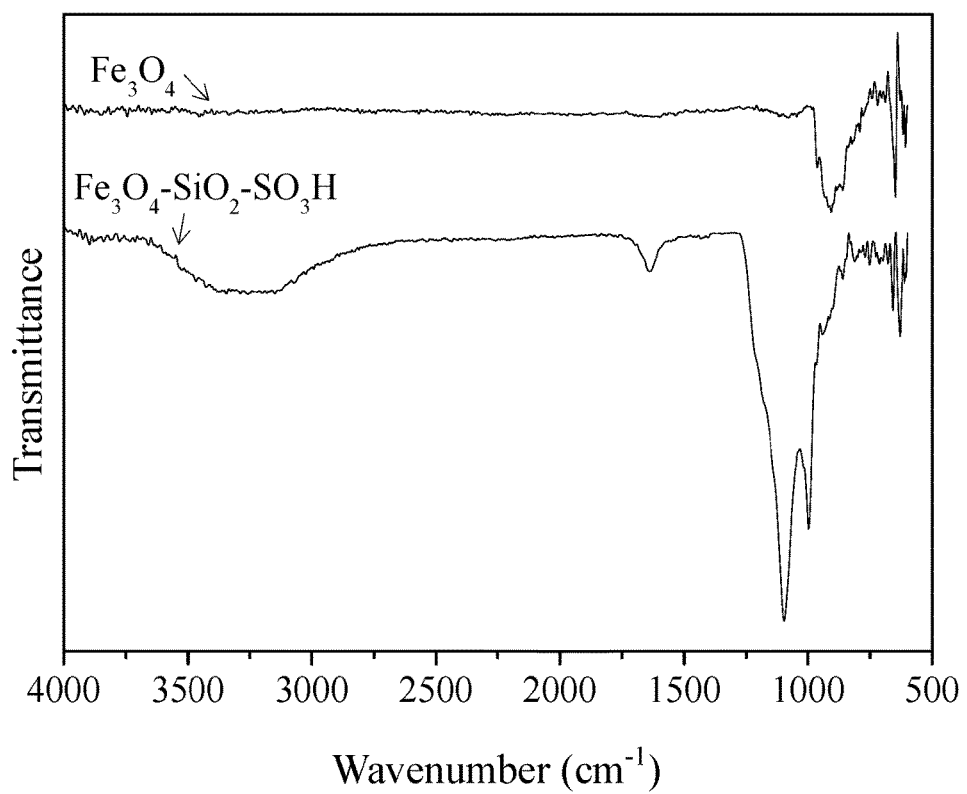
FIG. 4 shows a FTIR spectrum of a sulfonated iron oxide solid catalyst in accordance with one embodiment of the disclosure.

The sulfonated iron oxide solid catalyst (code name: $Fe_3O_4$—$SiO_2$—$SO_3H$) prepared in this example and an unsulfonated iron oxide raw material (code name: $Fe_3O_4$) were subjected to FTIR structure identification. The results were shown in FIG. 4. For the sulfonated iron oxide solid catalyst prepared in this example, a —OH functional group appeared at 2,500 $cm^{-1}$ to 3,500 $cm^{-1}$ and an S=O functional group appeared at 1,035 $cm^{-1}$ to 1,180 $cm^{-1}$ in the FTIR spectrum. It was concluded that the sulfonated iron oxide solid catalyst prepared in this example have dual functional groups of hydroxyl group (—OH) and sulfonic acid group (—$SO_3H$) indeed.

Example 7

The Test of the Sugar Production Efficiency of the Solid Catalyst (1)

Cellulose and formic acid with a weight ratio of 10 wt % were used as a reactant. The sulfonated activated carbon solid catalyst (code name: Wako ACS) prepared in Example 1 with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 8

The Test of the Sugar Production Efficiency of the Solid Catalyst (2)

Cellulose and formic acid with a weight ratio of 10 wt % were used as a reactant. The solid catalyst of commercially available activated carbon subjected to sulfonation (code name: TYPE 1 ACS) with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 9

The Test of the Sugar Production Efficiency of the Solid Catalyst (3)

Cellulose and formic acid with a weight ratio of 10 wt % were used as a reactant. The solid catalyst of commercially available lignin subjected to sulfonation (code name: Kraft Lignin S) with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 10

The Test of the Sugar Production Efficiency of the Solid Catalyst (4)

Cellulose and formic acid with a weight ratio of 10 wt % were used as a reactant. The solid catalyst of bagasse obtained after sugar production subjected to refluxing carbonization and sulfonation (code name: BRCS-RC) prepared in Example 4 with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 11

The Test of the Sugar Production Efficiency of the Solid Catalyst (5)

Cellulose and formic acid with a weight ratio of 10 wt % were used as a reactant. The solid catalyst of bagasse obtained after sugar production subjected to high-temperature carbonization and sulfonation (code name: BRCS-HT) prepared in Example 5 with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 12

The Test of the Sugar Production Efficiency of the Solid Catalyst (6)

Cellulose and formic acid with a weight ratio of 10 wt % were used as a reactant. The solid catalyst of bagasse obtained after sugar production subjected to direct sulfonation (code name: BRS 1) prepared in Example 3 with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 13

The Test of the Sugar Production Efficiency of the Solid Catalyst (7)

Cellulose and formic acid with a weight ratio of 10 wt % were used as a reactant. The solid catalyst of bagasse obtained after sugar production subjected to direct sulfonation (code name: BRS 2) prepared in Example 3 with a weight ratio of 3.9 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 60° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 14

The Test of the Sugar Production Efficiency of the Solid Catalyst (8)

Cellulose and formic acid with a weight ratio of 10 wt % were used as a reactant. The solid catalyst of bagasse obtained after sugar production subjected to direct sulfonation (code name: BRS 2) prepared in Example 3 with a weight ratio of 7.8 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 60° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 15

The Test of the Sugar Production Efficiency of the Solid Catalyst (9)

Cellulose and formic acid with a weight ratio of 10 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 60° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 16

The Test of the Sugar Production Efficiency of the Solid Catalyst (10)

Cellulose and formic acid with a weight ratio of 10 wt % were used as a reactant. The solid catalyst of bagasse obtained after sugar production subjected to direct sulfonation (code name: BRS 2) prepared in Example 3 with a weight ratio of 3.9 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 60° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

Example 17

The Test of the Sugar Production Efficiency of the Solid Catalyst (11)

Cellulose and formic acid with a weight ratio of 10 wt % were used as a reactant. The solid catalyst of bagasse obtained after sugar production subjected to direct sulfonation (code name: BRS 2) prepared in Example 3 with a weight ratio of 3.9 wt % relative to the reactant was added to proceed to a cellulose dissolution reaction under a reflux system. After the cellulose dissolution reaction was completed, water (50 wt % of the reaction mixture) was added to the reaction mixture to proceed to a hydrolysis reaction at 100° C. for 3 hours. After the cellulose esterification hydrolysis to produce sugar was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 1.

TABLE 1

| Solid catalyst | Pretreatment (carbonization) | Acidity (mmol [H$^+$]/g) | Catalyst amount (wt %) | Dissolution temp/time | Sugar yield (%) |
|---|---|---|---|---|---|
| Wako ACS | No | 4.07 | 15.6 | 100° C./3 hr | 41.4 |
| TYPE 1 ACS | | 3.93 | | | 36.5 |
| Kraft Lignin S | | 2.04 | | | 35.7 |
| BRCS-RC | Refluxing carbonization | 2.82 | | | 58.6 |
| BRCS-HT | High-temperature carbonization | 2.29 | | | 70.9 |
| BRS 1 | No | 3.03 | | | 67.7 |
| BRS 2 | No | 5.50 | 3.9 | 60° C./3 hr | 92.7 |
| | | | 7.8 | | 63.6 |
| | | | 15.6 | | 37.3 |
| | | | 3.9 | 60° C./3 hr | 37.6 |
| | | | | 100° C./3 hr | 56.0 |

Example 18

The Test of the Sugar Production Efficiency of the Solid Catalyst (12)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 101° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 19

The Test of the Sugar Production Efficiency of the Solid Catalyst (13)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 101° C. reflux system for 3 hours. After the corn stalk dissolution reaction was completed, water (50 wt % of the reaction mixture) was added to the reaction mixture to proceed to a primary hydrolysis reaction at 100° C. for 2 hours. 10 g product of the primary hydrolysis reaction, 10 g sulfuric acid (3M) and 15 g deionized water were mixed to proceed to a secondary hydrolysis reaction at 100° C. for 0.5 hour. The product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 20

The Test of the Sugar Production Efficiency of the Solid Catalyst (14)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant, an azeotropic agent of n-hexane with a weight ratio of 18.25 wt % relative to the reactant, and 1 wt % sulfuric acid were added to proceed to a corn stalk dissolution reaction under a 64° C. reflux system for 3 hours. After the corn stalk dissolution reaction was completed, the product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 21

The Test of the Sugar Production Efficiency of the Solid Catalyst (15)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant, an azeotropic agent of n-hexane with a weight ratio of 18.25 wt % relative to the reactant, and 1 wt % sulfuric acid were added to proceed to a corn stalk dissolution reaction under a 64° C. reflux system for 3 hours. After the corn stalk dissolution reaction was completed, water (50 wt % of the reaction mixture) was added to the reaction mixture to proceed to a hydrolysis reaction at 100° C. for 1 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 22

The Test of the Sugar Production Efficiency of the Solid Catalyst (16)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant, an azeotropic agent of n-hexane with a weight ratio of 18.25 wt % relative to the reactant, and 1 wt % sulfuric acid were added to proceed to a corn stalk dissolution reaction under a 64° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 23

The Test of the Sugar Production Efficiency of the Solid Catalyst (17)

Corn stalk and formic acid with a weight ratio of 15 wt % were used as a reactant. The solid catalyst of bagasse obtained after sugar production subjected to direct sulfonation (code name: BRS 2) prepared in Example 3 with a weight ratio of 15.6 wt % relative to the reactant, an azeotropic agent of n-hexane with a weight ratio of 18.25 wt % relative to the reactant, and 1 wt % sulfuric acid were added to proceed to a corn stalk dissolution reaction under a 64° C. reflux system for 3 hours. After the corn stalk dissolution reaction was completed, water (50 wt % of the reaction mixture) was added to the reaction mixture to proceed to a primary hydrolysis reaction at 100° C. for 2 hours. 10 g product of the primary hydrolysis reaction, 10 g sulfuric acid (3M) and 15 g deionized water were mixed to proceed to a secondary hydrolysis reaction at 100° C. for 0.5 hour. The product was collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 24

The Test of the Sugar Production Efficiency of the Solid Catalyst (18)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 40° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 25

The Test of the Sugar Production Efficiency of the Solid Catalyst (19)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 60° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 26

The Test of the Sugar Production Efficiency of the Solid Catalyst (20)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 80° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 27

The Test of the Sugar Production Efficiency of the Solid Catalyst (21)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 100° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 28

The Test of the Sugar Production Efficiency of the Solid Catalyst (22)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 1.95 wt % relative to the reactant was added to proceed to a corn stalk dissolution reaction under a 100° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 29

The Test of the Sugar Production Efficiency of the Solid Catalyst (23)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 3.90 wt % relative to the reactant was added to proceed to a corn stalk dissolution reaction under a 100° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 30

The Test of the Sugar Production Efficiency of the Solid Catalyst (24)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 7.80 wt % relative to the reactant was added to proceed to a corn stalk dissolution reaction under a 100° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 31

The Test of the Sugar Production Efficiency of the Solid Catalyst (25)

Corn stalk and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant and an azeotropic agent of n-hexane with a weight ratio of 18.25 wt % relative to the reactant were added to proceed to a corn stalk dissolution reaction under a 64° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 32

The Test of the Sugar Production Efficiency of the Solid Catalyst (26)

Corn stalk and formic acid with a weight ratio of 25 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a corn stalk dissolution reaction under a 60° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 33

The Test of the Sugar Production Efficiency of the Solid Catalyst (27)

Corn stalk and formic acid with a weight ratio of 25 wt % were used as a reactant. The solid catalyst of bagasse obtained after sugar production subjected to direct sulfonation (code name: BRS 2) prepared in Example 3 with a weight ratio of 15.6 wt % relative to the reactant and an azeotropic agent of n-hexane with a weight ratio of 18.25 wt % relative to the reactant were added to proceed to a corn stalk dissolution reaction under a 64° C. reflux system for 3 hours. After the corn stalk dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 34

The Test of the Sugar Production Efficiency of the Solid Catalyst (28)

Bagasse and formic acid with a weight ratio of 20 wt % were used as a reactant. The solid catalyst of bagasse obtained after sugar production subjected to direct sulfonation (code name: BRS 2) prepared in Example 3 with a weight ratio of 15.6 wt % relative to the reactant was added to proceed to a bagasse dissolution reaction under a 60° C. reflux system for 3 hours. After the bagasse dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 35

The Test of the Sugar Production Efficiency of the Solid Catalyst (29)

Bagasse and formic acid with a weight ratio of 20 wt % were used as a reactant. The solid catalyst of bagasse obtained after sugar production subjected to direct sulfonation (code name: BRS 2) prepared in Example 3 with a weight ratio of 20.4 wt % relative to the reactant was added to proceed to a bagasse dissolution reaction under a 60° C. reflux system for 3 hours. After the bagasse dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 36

The Test of the Sugar Production Efficiency of the Solid Catalyst (30)

Bagasse and formic acid with a weight ratio of 25 wt % were used as a reactant. The solid catalyst of bagasse obtained after sugar production subjected to direct sulfonation (code name: BRS 2) prepared in Example 3 with a weight ratio of 20.4 wt % relative to the reactant was added to proceed to a bagasse dissolution reaction under a 60° C.

reflux system for 3 hours. After the bagasse dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 37

The Test of the Sugar Production Efficiency of the Solid Catalyst (31)

Bagasse and formic acid with a weight ratio of 25 wt % were used as a reactant. The solid catalyst of bagasse obtained after sugar production subjected to direct sulfonation (code name: BRS 2) prepared in Example 3 with a weight ratio of 20.4 wt % relative to the reactant and an azeotropic agent of n-hexane with a weight ratio of 18.25 wt % relative to the reactant were added to proceed to a bagasse dissolution reaction under a 64° C. reflux system for 3 hours. After the bagasse dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 2.

Example 38

The Test of the Sugar Production Efficiency of the Solid Catalyst (32)

The sulfonated iron oxide solid catalyst prepared in Example 6 was taken. The weight ratio between corn stalk and formic acid was 10:90. The effects of biomass pretreatment, addition of azeotropic agent or inorganic acid, and performing secondary hydrolysis on biomass hydrolysis to produce sugar were evaluated. The results are shown in Table 3.

Reactant: 10 wt % corn stalk, the sulfonated iron oxide solid catalyst/corn stalk and formic acid=0.156, and n-hexane/corn stalk and formic acid=0.1825. Secondary hydrolysis: 10 g product of esterification to produce sugar, 10 g sulfuric acid (3M) and 15 g deionized water were mixed and reacted at 100° C. for 30 minutes.

TABLE 3

| Corn stalk pretreatment | Esterification condition (3 hr) | | | Hydrolysis time (hr) | | Sugar yield (%) |
|---|---|---|---|---|---|---|
| | 1 wt % Sulfuric acid | Azeotropic agent | Temp. (C.) | Primary hydrolysis | Secondary hydrolysis | |
| Coarse crushing | No | No | 101 | 2 | 0 | 30.2 |
| | | n-hexane | 64 | 2 | 0 | 41.1 |
| Grinding | No | No | 101 | 2 | 0 | 45.3 |
| | | n-hexane | 64 | 2 | 0 | 52.3 |
| Coarse crushing | Yes | n-hexane | 64 | 0 | 0 | 47.8 |
| | | | | 1 | 0 | 51.6 |
| | | | | 2 | 0 | 58.1 |
| Grinding | Yes | n-hexane | 64 | 0 | 0 | 66.6 |
| | | | | 1 | 0 | 70.6 |
| | | | | 2 | 0 | 76.6 |
| | | | | 2 | 0.5 | 83.3 |

TABLE 2

| Biomass | Weight ratio (wt %) | Esterification condition (3 hr) | | | | Hydrolysis time/ 100° C. (hr) | | Sugar yield (%) |
|---|---|---|---|---|---|---|---|---|
| | | Catalyst | | | | | | |
| | | 1 wt % Sulfuric acid | BRS 2 (wt %) | Azeotropic agent | Temp. (° C.) | Primary hydrolysis | Secondary hydrolysis | |
| Corn stalk | 15 | No | 15.6 | No | 101 | 2 | 0 | 50.4 |
| | | | | | | 2 | 0.5 | 56.7 |
| | | Yes | 15.6 | n-hexane | 64 | 0 | 0 | 86.8 |
| | | | | | | 1 | 0 | 90.6 |
| | | | | | | 2 | 0 | 93.6 |
| | | | | | | 2 | 0.5 | 98.7 |
| | 20 | No | 15.6 | No | 40 | 2 | 0 | 58.2 |
| | | | | | 60 | | | 93.2 |
| | | | | | 80 | | | 90.1 |
| | | | | | 100 | | | 33.2 |
| | | No | 1.95 | No | 100 | 2 | 0 | 64.0 |
| | | | 3.90 | | | | | 70.2 |
| | | | 7.80 | | | | | 49.8 |
| | | No | 15.6 | n-hexane | 64 | 2 | 0 | 91.6 |
| | 25 | No | 15.6 | No | 60 | 2 | 0 | 73.4 |
| | | No | | n-hexane | 64 | | | 87.8 |
| Bagasse | 20 | No | 15.6 | No | 60 | 2 | 0 | 81.7 |
| | | | 20.4 | No | | | | 83.9 |
| | 25 | No | 20.4 | No | 60 | 2 | 0 | 62.8 |
| | | | | n-hexane | 64 | | | 81.4 |

The results from Table 3 indicate that the sugar-producing effect of the biomass after grinding (The corn stalk was ground through a sieve with mesh no. 30, and the particle size thereof was less than 0.59 mm) is better than that after coarse crushing due to formation of a large contact surface area between the biomass and the solid catalyst after grinding to improve reactivity therebetween. Among the reaction conditions, the effect of adding the azeotropic agent is preferred. The corn stalk after pretreatment of grinding and the azeotropic agent of n-hexane were used. After esterification for 3 hours, 50 wt % water was added and hydrolyzed for 2 hours. The sugar yield was 76.6 wt %. The product was subjected to the secondary hydrolysis by adding sulfuric acid, and the sugar yield reached 83.3 wt %. After the reaction, the catalyst was attracted by a strong magnet, and the recovery rate of the catalyst reached over 98 wt %. After the catalyst was washed and reused three times, the sugar yield reached 81 wt %.

Comparative Example 1

The Test of the Sugar Production Efficiency of a Conventional Solid Catalyst (1)

Cellulose and formic acid with a weight ratio of 5:95 were used as a reactant. An Amberlyst 35 solid catalyst with a weight ratio of 15.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 1.5 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 2

The Test of the Sugar Production Efficiency of a Conventional Solid Catalyst (2)

Cellulose and formic acid with a weight ratio of 5:95 were used as a reactant. An Amberlyst 35 solid catalyst with a weight ratio of 15.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 3

The Test of the Sugar Production Efficiency of a Conventional Solid Catalyst (3)

Cellulose and formic acid with a weight ratio of 5:95 were used as a reactant. A titanium dioxide solid catalyst with a weight ratio of 20.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 4

The Test of the Sugar Production Efficiency of a Conventional Solid Catalyst (4)

Cellulose and formic acid with a weight ratio of 5:95 were used as a reactant. A Nafion solid catalyst with a weight ratio of 8.4 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 3 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 5

The Test of the Sugar Production Efficiency of a Conventional Solid Catalyst (5)

Cellulose and formic acid with a weight ratio of 5:95 were used as a reactant. An aluminum powder solid catalyst with a weight ratio of 20.3 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 1.5 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 6

The Test of the Sugar Production Efficiency of a Conventional Solid Catalyst (6)

Cellulose and formic acid with a weight ratio of 5:95 were used as a reactant. A silicon dioxide solid catalyst with a weight ratio of 8.33 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 3 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 7

The Test of the Sugar Production Efficiency of a Conventional Solid Catalyst (7)

Cellulose and formic acid with a weight ratio of 5:95 were used as a reactant. A HY-zeolite solid catalyst with a weight ratio of 15.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 3 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 8

The Test of the Sugar Production Efficiency of a Conventional Solid Catalyst (8)

Cellulose and formic acid with a weight ratio of 5:95 were used as a reactant. A tin dioxide solid catalyst with a weight ratio of 8.3 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 9

The Test of the Sugar Production Efficiency of a Conventional Solid Catalyst (9)

Cellulose and formic acid with a weight ratio of 5:95 were used as a reactant. An iron oxide solid catalyst with a weight ratio of 16.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 4 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 10

The Test of the Sugar Production Efficiency of a Conventional Solid Catalyst (10)

Cellulose and formic acid with a weight ratio of 5:95 were used as a reactant. A heteropoly acid ($H_3PW_{12}O_{40}$) solid catalyst with a weight ratio of 5 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 1.5 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 11

The Test of the Sugar Production Efficiency of a Conventional Solid Catalyst (11)

Cellulose and formic acid with a weight ratio of 5:95 were used as a reactant. An activated carbon solid catalyst with a weight ratio of 18.5 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 12

The Test of the Sugar Production Efficiency of a Conventional Solid Catalyst (12)

Cellulose and formic acid with a weight ratio of 10:90 were used as a reactant. A Dowex solid catalyst with a weight ratio of 15.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 13

The Test of the Sugar Production Efficiency of a Conventional Solid Catalyst (13)

Cellulose and formic acid with a weight ratio of 10:90 were used as a reactant. An Amberlyst 35 solid catalyst with a weight ratio of 15.6 wt % relative to the reactant was added to proceed to a cellulose dissolution reaction under a 101° C. reflux system for 3 hours. After the cellulose dissolution reaction was completed, water (50 wt % of the reaction mixture) was added to the reaction mixture to proceed to a hydrolysis reaction at 100° C. for 2 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

Comparative Example 14

The Test of the Sugar Production Efficiency of a Conventional Solid Catalyst (14)

Cellulose and formic acid with a weight ratio of 10:90 were used as a reactant. A ZSM-5 solid catalyst with a weight ratio of 15.6 wt % relative to the reactant was added to proceed to a cellulose dissolution reaction under a 101° C. reflux system for 4 hours. After the cellulose dissolution reaction was completed, water (50 wt % of the reaction mixture) was added to the reaction mixture to proceed to a hydrolysis reaction at 100° C. for 1.5 hours. The product was then collected and the sugar yield was analyzed.

The total reducing sugar content of the sample was measured using 3,5-dinitro-salicylic acid (DNS) method. The content of glucose was measured using high performance liquid chromatography (HPLC). The reducing sugar comprised glucose, xylose, mannose, arabinose and oligosaccharides. The test results of sugar production efficiency of this example are shown in Table 4.

TABLE 4

| Cellulose/ formic acid (wt %) | Dissolution reaction | | Hydrolysis reaction | |
|---|---|---|---|---|
| | Catalyst (wt %) | Time (hr) | Time (hr) | Sugar yield (%) |
| 5/95 | 15.6% Amberlyst 35 | 3 | 1.5 | 35.8 |
| 5/95 | 15.6% Amberlyst 35 | 3 | 2 | 30.4 |
| 5/95 | 20.6% Titanium dioxide | 3 | 2 | 11.6 |
| 5/95 | 8.4% Nafion | 3 | 3 | 15.4 |
| 5/95 | 20.3% Aluminum powder | 3 | 1.5 | 3.7 |
| 5/95 | 8.33% Silicon dioxide | 3 | 3 | 4.0 |
| 5/95 | 15.6% HY-zeolite | 3 | 3 | 12.8 |
| 5/95 | 8.3% Tin dioxide | 3 | 2 | 11.2 |
| 5/95 | 16.6% Iron oxide | 3 | 4 | 15.2 |
| 5/95 | 5% $H_3PW_{12}O_{40}$ | 3 | 1.5 | 48.8 |
| 5/95 | 18.5% Activated carbon | 3 | 2 | 43.5 |
| 10/90 | 15.6% Dowex | 3 | 2 | 16.8 |
| 10/90 | 15.6% Amberlyst 35 | 3 | 2 | 35.8 |
| 10/90 | 15.6% ZSM-5 | 4 | 1.5 | 18.4 |

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A method for preparing a sugar, comprising:
   mixing an organic acid and a solid catalyst to form a mixing solution, said solid catalyst comprising: (a) a core particle having a surface composed of activated carbon, lignin or iron oxide; and (b) a plurality of hydroxyl groups and sulfonic acid groups formed on the surface of the core particle;
   adding a cellulosic biomass to the mixing solution to proceed to a dissolution reaction; adding an inorganic acid to the mixing solution to proceed to the dissolution reaction, wherein the inorganic acid has a weight ratio of 0.5-3 wt % in the mixing solution; and
   adding water to the mixing solution to proceed to a hydrolysis reaction to obtain a hydrolysis product.

2. The method for preparing a sugar as claimed in claim 1, wherein the organic acid comprises formic acid, acetic acid or a mixture thereof.

3. The method for preparing a sugar as claimed in claim 1, wherein the organic acid has a weight ratio of 75-95 wt % in the mixing solution.

4. The method for preparing a sugar as claimed in claim 1, wherein the solid catalyst has a weight ratio of 0.5-21 wt % in the mixing solution.

5. The method for preparing a sugar as claimed in claim 1, wherein the cellulosic biomass comprises whole cellulose, hemicellulose or lignin.

6. The method for preparing a sugar as claimed in claim 1, wherein the cellulosic biomass has a weight ratio of 5-25 wt % in the mixing solution.

7. The method for preparing a sugar as claimed in claim 1, wherein the cellulosic biomass is derived from wood, grass, leaves, algae, waste paper, corn stalk, corn cobs, rice straw, rice husk, wheat straw, bagasse, bamboo or crop stems.

8. The method for preparing a sugar as claimed in claim 1, further comprising adding an azeotropic agent to the mixing solution to proceed to the dissolution reaction.

9. The method for preparing a sugar as claimed in claim 8, wherein the azeotropic agent comprises esters, ketones or alkanes.

10. The method for preparing a sugar as claimed in claim 9, wherein the azeotropic agent comprises n-hexane.

11. The method for preparing a sugar as claimed in claim 8, wherein the azeotropic agent has a weight ratio of 15-45 wt % in the mixing solution.

12. The method for preparing a sugar as claimed in claim 1, wherein the inorganic acid comprises hydrochloric acid, sulfuric acid, phosphoric acid, nitric acid or a combination thereof.

13. The method for preparing a sugar as claimed in claim 1, wherein the dissolution reaction has a reaction temperature of 60-101° C.

14. The method for preparing a sugar as claimed in claim 1, wherein the dissolution reaction has a reaction time of 60-240 minutes.

15. The method for preparing a sugar as claimed in claim 1, wherein the dissolution reaction has a reaction pressure of 0.9-1.1 atm.

16. The method for preparing a sugar as claimed in claim 1, wherein water has a weight ratio of 25-100 wt % in the mixing solution.

17. The method for preparing a sugar as claimed in claim 1, wherein the hydrolysis reaction has a reaction temperature of 100-110° C.

18. The method for preparing a sugar as claimed in claim 1, wherein the hydrolysis reaction has a reaction time of 30-180 minutes.

19. The method for preparing a sugar as claimed in claim 1, wherein the hydrolysis reaction has a reaction pressure of 0.9-1.1 atm.

20. The method for preparing a sugar as claimed in claim 1, further comprising adding an inorganic acid to the hydrolysis product to proceed to a secondary hydrolysis reaction.

21. The method for preparing a sugar as claimed in claim 20, wherein the inorganic acid comprises hydrochloric acid, sulfuric acid, phosphoric acid, nitric acid or a combination thereof.

22. The method for preparing a sugar as claimed in claim 20, wherein the inorganic acid has a weight ratio of 0.5-3 wt % in the hydrolysis product.

\* \* \* \* \*